Jan. 28, 1930. W. W. TAMPLIN 1,744,993
EYEGLASSES OR SPECTACLES
Filed July 14, 1927
Fig.1.
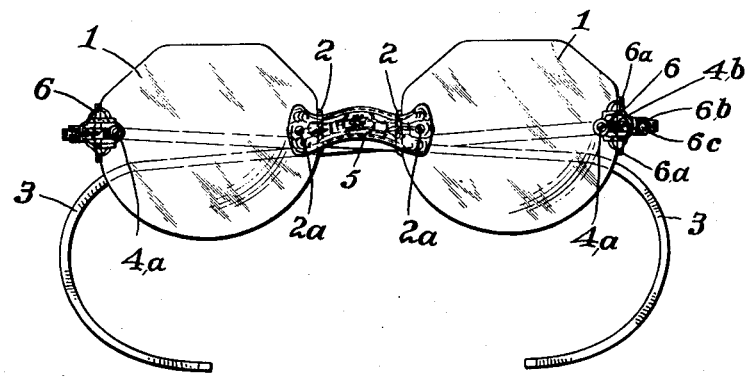
Fig.2.
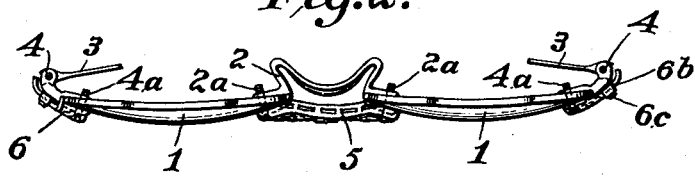
Fig.3.
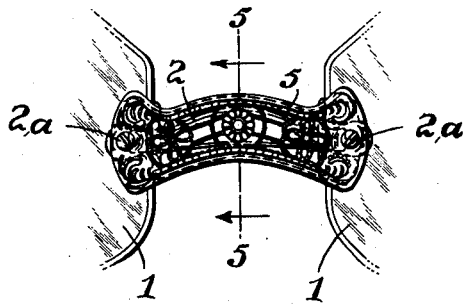
Fig.4.
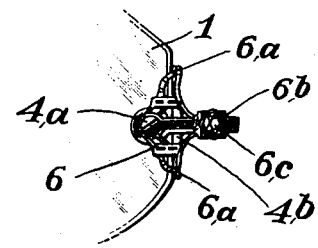
Fig.5.
Fig.6.
Inventor:
William W. Tamplin,
by Spear Middleton Donaldson & Hall
Attys.

Patented Jan. 28, 1930

1,744,993

UNITED STATES PATENT OFFICE

WILLIAM W. TAMPLIN, OF HUTCHINSON, KANSAS

EYEGLASSES OR SPECTACLES

Application filed July 14, 1927. Serial No. 205,657.

My invention relates to improvements in eyeglasses or spectacles and has among its objects to provide attachments which may be such articles in additon to the regular mountings thereof which will be of an attractive, ornamental or decorative appearance.

A further object is to provide attachment means of this type which will have a bracing or strengthening effect supplementing the holding action of the regular frame construction.

Another object is to so construct the attachments that they may be made as separate articles and readily attached to eyeglass or spectacle frames as regularly manufactured.

With these several objects in view the invention includes the novel features of construction and arrangement and combination of parts hereinafter described, the nature and scope of the invention being defined and ascertained by the appended claim.

What I at present consider the preferred embodiment of the invention is illustrated in the accompanying drawing, in which:—

Figure 1 is a front view of a pair of spectacles having my improved attachments applied thereto.

Fig. 2 is an edge view, and

Figs. 3 to 6 are enlarged detail views.

Referring by reference characters to this drawing, the numerals 1, 1 designate the lenses, which in the present instance and merely as an example, are shown as rimless, and are connected together by the nose or bridge piece 2 which may be of the ordinary or any desired construction, secured to the lenses by the usual screws 2ª.

3, 3, designate the temples which likewise are of the ordinary construction and secured to the lenses by the customary attachment means 4 to which the temples are hinged and which attachment means include the screws 4ª.

My improved ornamental and bracing attachments comprise the elements 5 and 6, 6, respectively. The former is positioned in front of the nose piece or bridge and is designed to completely cover and conceal the same. It may be of any desired ornamental appearance, preferably of open or filigree work as shown which gives lightness and for further purposes of lightness and strength it is preferably made of channel shape in cross section as shown. The ends of this member 5 which overlie the inner edges of the lenses, are held in place preferably by the same screws that secure the lenses to the nose piece. being provided with properly alined openings to receive the screws.

In a similar manner the attachments 6 overlie the temple attaching means and are held in position by the securing screws 4ª thereof. Such temple attaching means usually comprise cross members 4ᵇ designed to abut the end edges of the lenses and the attachments 6 are preferably provided with vertical extensions which are deflected inward to overlie the upper and lower ends of the members 4ᵇ as indicated at 6ª. Said attachments 6 also have extensions 6ᵇ overlying the temple hinges, which extensions may serve as jewel mountings as indicated at 6ᶜ.

These attachments 6 may likewise be of openwork or filigree nature.

While I have shown the attachments in connection with a pair of rimless spectacles it will be understood that this is by way of example only, and that the same are equally applicable to spectacles of the rim type and to eyeglasses which clamp on the nose only and are unprovided with temples, in which case the attachments 6 would not be needed.

It will also be understood that the design of ornamentation shown is by way of illustration only, and may be changed as desired. In the subjoined claim where the term eyeglasses is used it is intended, unless otherwise qualified, to include such articles either with or without temples.

As hereinbefore indicated the rimless spectacles illustrated in the drawings are by way of example only, the invention being applicable to spectacles or eyeglasses of either the rim or rimless type, and provided either with screw, clamp or keylock mountings.

The attachments further may be of not only filagree construction, but solid or openwork, and engraved, chased, engine turned or damaskeen construction and used either with or without jewels.

The attachments may overlap the lenses or only flush with the edges thereof and be held by screws, clamps or any analogous fastening means, or they may be permanently secured to the original frames or mountings by soldering or the like, and obviously the attachments may be made of any desired material.

Having thus described my invention, what I claim is:

In combination in a pair of eyeglasses having lenses, temples, and a nose-piece, and including lens connections to the temples and nose piece, ornamental supplementary attachments overlying and disposed in front of said lens connections and nose piece and the adjacent front faces of the lenses to cover and decorate the same, and means for securing said ornamental attachments in position, said ornamental supplementary attachments comprising, a pair of attachments overlying the lens connections at the temples and overlying the edges and a portion of the faces of the lenses above and below the lens connection at the temples, and an ornamental attachment overlying the nose piece and the lens connections at the nose piece.

In testimony whereof, I affix my signature.

WILLIAM W. TAMPLIN.